United States Patent [19]

Kwok et al.

[11] Patent Number: 5,387,940
[45] Date of Patent: Feb. 7, 1995

[54] METHOD AND APPARATUS FOR PROVIDING SCALEABLE COMPRESSED VIDEO SIGNAL

[75] Inventors: Wilson Kwok, Plainsboro, N.J.; Billy W. Beyers, Jr., Greenfield, Ind.; Babak Ayazifar, Plainsboro; Joel W. Zdepski, Belle Mead, both of N.J.

[73] Assignee: RCA Thomson Licensing Corporation, Princeton, N.J.

[21] Appl. No.: 88,474

[22] Filed: Jul. 7, 1993

[51] Int. Cl.⁶ .................. H04N 7/01; H04N 7/00; H04N 11/00
[52] U.S. Cl. ...................... 348/446; 348/384; 348/394; 348/409; 348/415
[58] Field of Search ............. 358/140, 135, 136, 133, 358/141, 152; H04N 7/00, 11/00, 7/01; 348/384, 390, 394, 409, 412, 415, 446, 447

[56] References Cited

U.S. PATENT DOCUMENTS

| | | | |
|---|---|---|---|
| 4,722,002 | 1/1988 | Mochizuki et al. | 348/384 |
| 4,740,831 | 4/1988 | Rhodes | 348/384 |
| 4,745,458 | 5/1988 | Hirano et al. | 348/446 |
| 5,029,001 | 7/1991 | Tanaka et al. | 348/447 |
| 5,072,296 | 12/1991 | Lim | 358/140 |
| 5,128,754 | 7/1992 | Dhein | 358/140 |
| 5,182,643 | 1/1993 | Futscher | 358/140 |
| 5,185,663 | 2/1993 | Hackett | 358/140 |

OTHER PUBLICATIONS

"High-Quality Coding of the Even Fields Based on the Odd Fields of Interlaced Video Sequences", Feng-Ming Wang and Dimitris Anustassiou, IEEE Transactions on Circuits and Systems, vol. 38, No. 1, Jan. 1991 pp. 140–142.

*Primary Examiner*—Tommy P. Chin
*Assistant Examiner*—Vu Le
*Attorney, Agent, or Firm*—Joseph S. Tripoli; Eric P. Herrmann; Ronald H. Kurdyla

[57] ABSTRACT

A compression/decompression system includes a source of non-interlaced scanned video signal. A preprocessor constructs interlaced scanned video signal from the non-interlaced scanned video signal by selection of alternate lines of successive non-interlaced image signals. The interlaced scanned video signal is compressed according to known methods to generate primary compressed video data. The primary data is decompressed by known processes, inverse to the compression processes, to regenerate the interlaced scanned frames. Interlaced scanned video signal, corresponding to the intervening lines of the non-interlaced scanned video signal, which were not included in the primary interlaced scanned video signal, is predicted from the decompressed frames of video signal. In addition the intervening lines of the original non-interlaced scanned video signal, which were not included in the primary interlaced scanned video signal, are formed into secondary interlaced scanned video signal. The secondary video signal is subtracted from the predicted video signal to generate secondary field residues. These residues are compressed by known methods to form compressed secondary video data. The primary and secondary compressed data are thereafter transmitted for reception by either interlaced scanned receivers or non-interlaced scanned receivers.

8 Claims, 6 Drawing Sheets

O = ODD LINES
E = EVEN LINES

METHOD AND APPARATUS FOR PROVIDING SCALEABLE COMPRESSED VIDEO SIGNAL

This invention relates to compressed video systems and more particularly to systems for providing compressed video which may be reproduced in interlaced form at a first resolution or non-interlaced form with a second higher resolution.

BACKGROUND OF THE INVENTION

Currently the Moving Picture Experts Group (MPEG) of the International Standardization Organization is attempting to establish a compressed signal standard or protocol for the transmission of video signals. There are two basic forms of video signal, interlace scanned signal and non-interlace scanned signal. Compression of interlace scanned video has advantages in that lesser bandwidth is required and both production and receiver equipment for compressing/decompressing interlace scanned signal can be manufactured at lower cost, than for non-interlaced scan signal. The television industry tends to favor a compressed video standard which is based on interlaced scanned signal. However, there are applications which almost demand non-interlaced scanned images, particularly in that segment of the computer community which process video images. The MPEG committee is desirous of satisfying both camps, that is establishing a standard which is useful to the greatest number of potential users. The present invention is directed to a compression system which provides compressed signal for the reproduction of both interlaced and non-interlaced scanned images without significantly increasing the compressed signal data rate over compressed interlaced scanned signal.

SUMMARY OF THE INVENTION

The compression/decompression system of the present invention includes a source of non-interlaced scanned video signal. A preprocessor constructs interlaced scanned video signal from the non-interlaced scanned video signal by selection of alternate lines of successive non-interlaced image signals. The interlaced scanned video signal is compressed according to known methods to generate primary compressed video data. The primary data is decompressed by known processes, inverse to the compression processes, to regenerate the interlaced scanned frames. Interlaced scanned video signal, corresponding to the intervening lines of the non-interlaced scanned video signal, which were not included in the primary interlaced scanned video signal, is predicted from the decompressed frames of video signal. In addition the actual intervening lines of the original non-interlaced scanned video signal, which were not included in the primary interlaced scanned video signal, are formed into secondary interlaced scanned video signal. The secondary video signal is subtracted from the corresponding predicted video signal to generate secondary field residues. These residues are compressed by known methods to form compressed secondary video data. The primary and secondary compressed data are thereafter transmitted for reception. The primary data may be received by less complex receivers for interlaced scanned reproduction of images having a first resolution. Both the primary and secondary compressed data may be received by more complex receivers, to reproduce non-interlaced scanned images of greater resolution.

DETAILED DESCRIPTION

Figure 1:
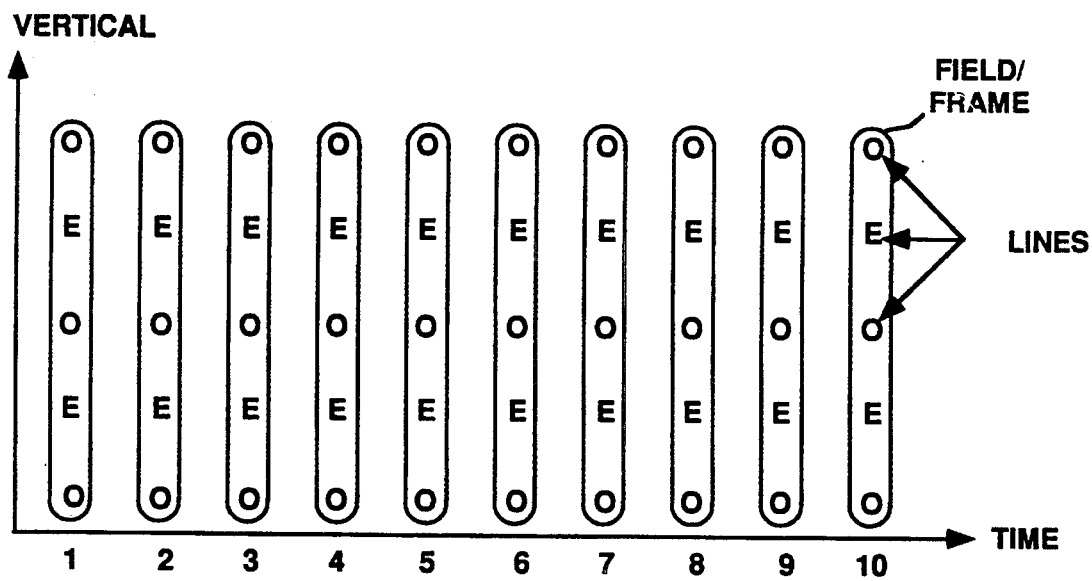
FIG. 1 is a pictorial diagram of the format of portions of respective frames of non-interlaced scanned video signal.

Referring to FIG. 1, the respective columns of letters (O's & E's) represent, in abbreviated form, the lines in non-interlaced scanned images (fields/frames) of video signal. These images occur at a rate of 60 per second. The non-interlaced scanned images occur at the field rate of interlaced scanned images and include twice the number of lines as a field of interlaced scanned video.

Interlaced scanned video occurs as successive fields of data occurring at a rate of 60 per second. Lines in even fields occur spatially between the lines of odd fields. Combining two successive fields forms a frame similar to one of the non-interlaced scanned images. However, because a finite time elapses between the scanning of successive interlaced scanned fields, a frame of interlaced scanned video will differ from a corresponding non-interlaced scanned image by virtue of any image motion occurring during the time elapsed between the scanning of successive interlaced fields.

Figure 2:
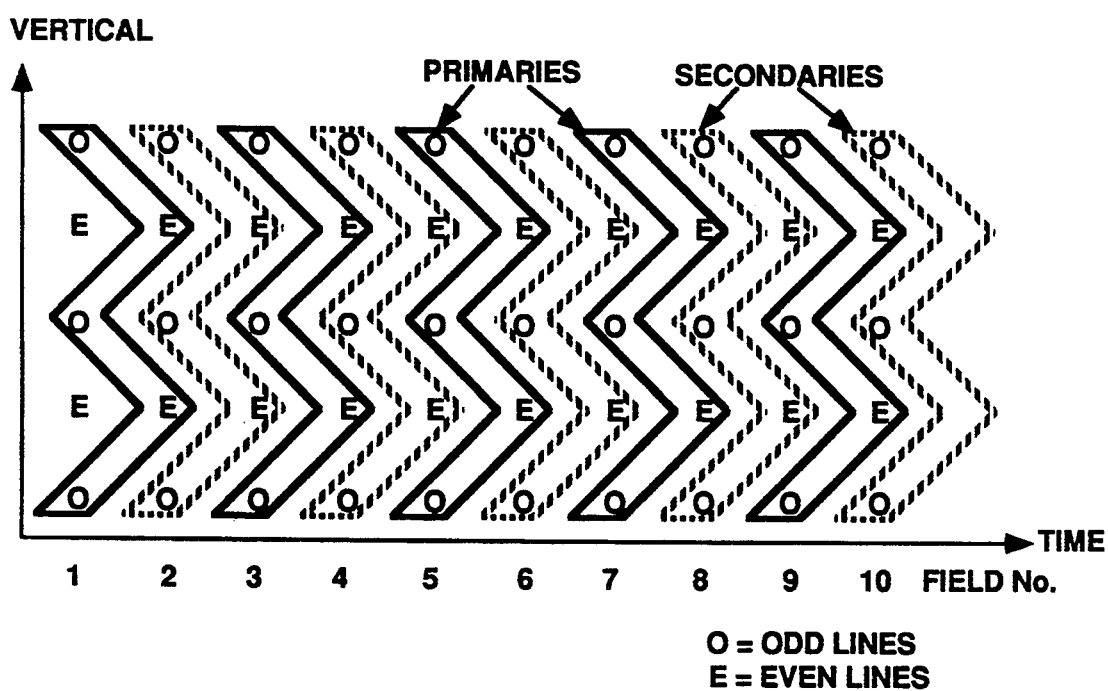
FIG. 2 is a pictorial diagram of the non-interlaced signal segmented into interlaced scanned frames of primary and secondary interlaced scanned frames of video information.

Interlaced scanned video may be generated from the non-interlaced scanned video signal by selecting alternate lines from alternate non-interlaced scanned images. Recall that non-interlaced images occur at a rate of 60 per second and interlaced frames occur at a rate of 30 per second (nominally). Hence if the odd numbered lines of the odd numbered non-interlaced images are combined with the even numbered lines of the even numbered images, interlaced scanned frames can be produced from the non-interlaced scanned signal. These frames are represented by the respective groupings of image lines circumscribed by the solid lines in FIG. 2 and will be referred to as primary frames. In forming the interlaced frames from non-interlaced data only fifty percent of the image information is used. The remaining data is arranged in secondary frames shown circumscribed by dashed lines in FIG. 2.

The primary frames represent interlaced scanned video data. The combination of both primary and secondary frames represent all of the non-interlaced scanned data but not in non-interlaced format. The latter includes twice the video data as the former and as such would tend to require twice the bandwidth to transmit. However, non-interlaced scanned information can be transmitted at significantly lessened data rates. This may be accomplished with the compression apparatus shown in FIGS. 3 or 4, each of which compress the primary frames as a first transmission component, and compress the differences between the secondary frames and secondary frames predicted from the primary frames as a second transmission component. Because the lines of the secondary and primary frames are spatially interleaved, there tends to be a large amount of image redundancy between the primary and secondary frames. Hence prediction of secondary frames from primary frames can be performed with good accuracy, resulting in the residues being mostly zero valued. As such the compressed residue data is significantly less than the amount of data that would be generated if the secondary frames were compressed.

Figure 3:
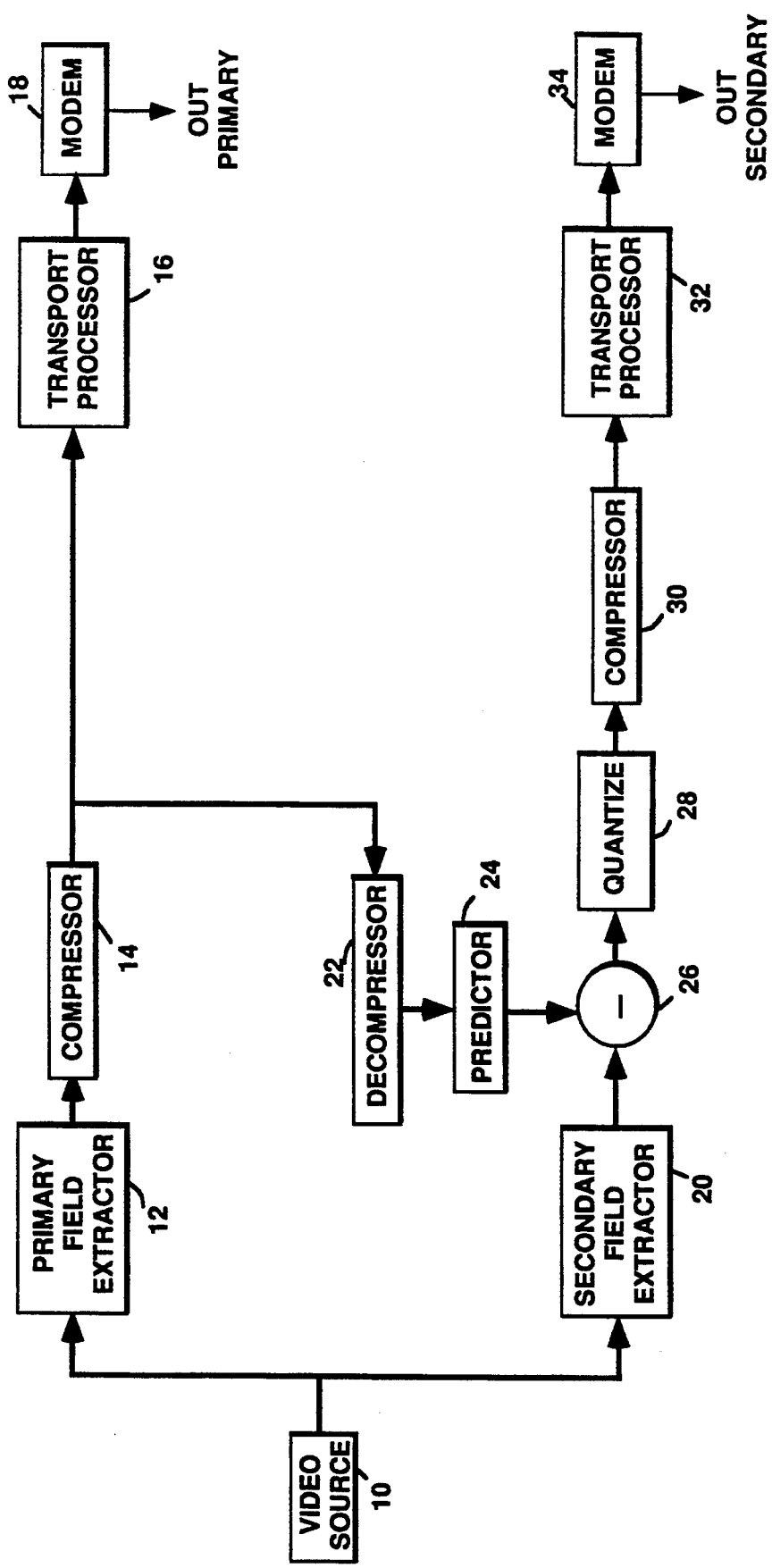
FIGS. 3 and 5 are block diagrams of alternative compression apparatus embodying the present invention.
Figure 4:
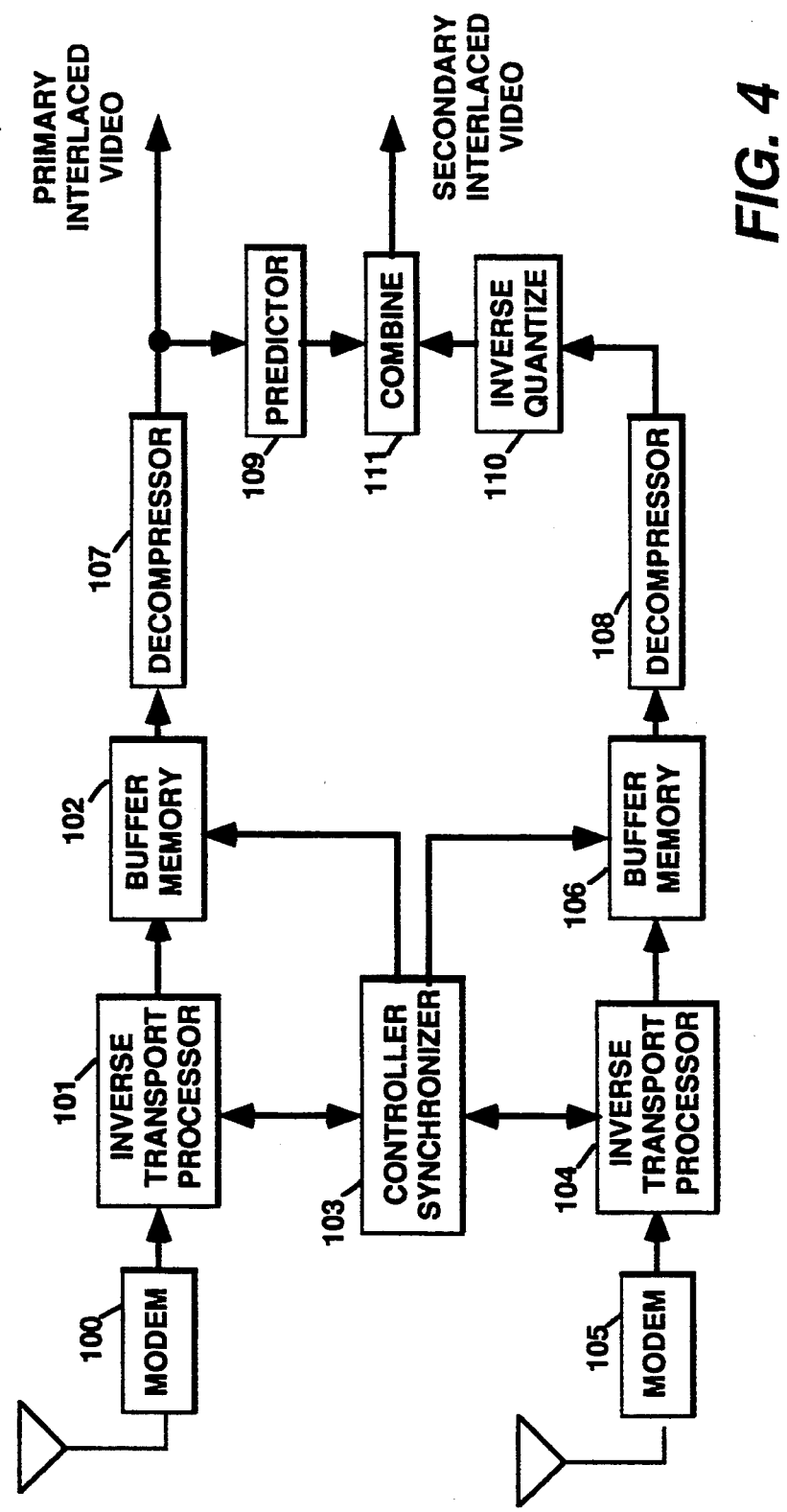
FIGS. 4 and 6 are block diagrams of alternative decompression apparatus embodying the present invention.

In both FIG. 3 and FIG. 4 it is presumed that the video signal source 10 provides non-interlaced scanned video data. The video data is applied to respective primary and secondary field extractors The primary field extractor 12 passes odd numbered field lines from odd numbered non-interlaced scanned images and even numbered field lines from from even numbered non-interlaced scanned images. The secondary field extractor 20 passes odd numbered field lines from even numbered non-interlaced scanned images and even numbered field lines from from odd numbered non-interlaced scanned images. The primary fields are coupled to a compression apparatus 14. Compression apparatus 14 may be of the motion compensated predictive type which first composes frames of data from successive fields and then generates compressed data from the composed frames. A description of this type of compression apparatus may be found in U.S. Pat. No. 5,122,875.

Compressed video data is coupled to a transport processor 16 which segments the compressed data into payload packets and adds identifying, synchronizing and error correction/detection data to the payload packets for transmission. The packetized data is coupled to a modem 18 which conditions the packetized data for conveyance over the selected transmission medium. The compressed primary fields/frames includes sufficient data to reproduce interlaced scanned images of a first level of spatial resolution. Depending on the particular system, the first level of spatial resolution may be equivalent to high definition television signals, or it may be of some lesser level of resolution e.g., standard NTSC resolution.

The compressed primary video signal from the compressor 14 is coupled to a decompressor 22 which reproduces the primary video signal in interlaced scanned format. The decompressor 22 is of the type which performs the inverse processes of the compressor 14, and is similar to decompressors to be utilized in interlaced scanned receivers for reproducing the compressed data transmitted by the modem 18. The reproduced primary video signal is coupled to a secondary field predictor 24. Predictor 24 generates lines that are interstitial to the lines of the reproduced primary fields. The predictor 24 may be, in part, that portion of a motion compensated interlaced scanned-to-non-interlaced scanned convertor that generates the missing lines of a non-interlaced scanned image from an interlaced scanned image, of which there are many variations known in the video signal processing art.

Predicted secondary fields from the predictor 24 are applied to one input terminal of a subtracter 26, and corresponding secondary fields from the extractor 20 are applied to a second input terminal of the subtracter 26. The differences or residues generated by the subtracter are coupled to a quantizer 28 wherein they are reduced to a predetermined bit width. (The foregoing anticipates digital signal processing and as such all signal are in digital format, and at least prior to compression, signals are defined by digital words of fixed bit-width.) Nominally the video samples are defined with eight-bit words. As a consequence the subtracter provides nine-bit words. The quantizer 28 may reduce the residues to eight- or seven-bit words.

The quantized residues, occurring in field format are applied to a compressor 32, which may be similar to the compressor 14. The compressor 30 provides compressed video data corresponding to the residues of the secondary fields, which compressed video data is coupled to a transport processor 32. The transport processor 32 operates in a fashion similar to the transport processor 16. Packetized data from the processor 32 is coupled to a modem 39 wherein it is conditioned for transmission.

The apparatus of FIG. 3 anticipates transmitting the compressed primary field data and the compressed secondary field data in distinct transmission channels, such as two cable channels, for example. The apparatus of FIG. 5, which is similar to the apparatus of FIG. 3, on the other hand anticipates transmitting both the compressed primary and secondary field data in the same transmission channel. The FIG. 5 apparatus is arranged for time division multiplexing of the primary and secondary data but it should be appreciated that the primary and secondary field data may, in the alternative, be frequency division multiplexed. Such frequency division multiplexing techniques are described in the afore mentioned U.S. Pat. No. 5,122,875.

Figure 5:
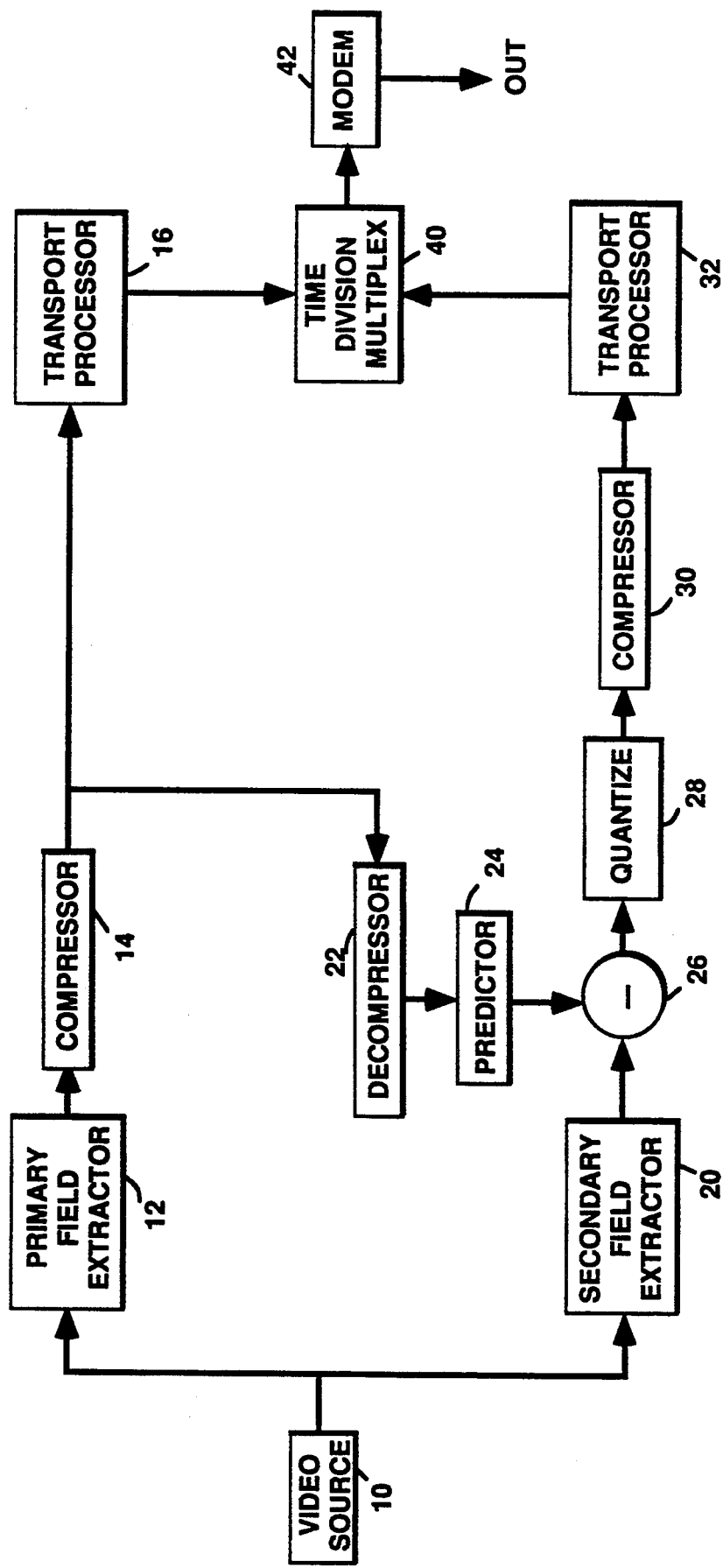

Referring to FIG. 5, elements designated with numbers similar to elements of FIG. 3, are similar and provide like functions. The respective primary and secondary field compressed data are applied to respective input ports of a time division multiplexing apparatus 40. This apparatus includes buffer memory to store compressed data provided by one or the other of the compressors 14 and 30, while data from the other is being serviced. The compression process may be arranged to provide variable bit rate compression, in which case the amount of data or the rate of data provided by either compressor 14 or 30 is not constant. In this instance it is not possible to predetermine the timing of multiplexing by the multiplexer 40. It is possible to generally predict the average ratio of data provided by both compressors and arrange the system such that time division multiplexing is performed substantially according to this ratio. Even in this case the primary field data is always given priority. If secondary field data is lost due to an excess of primary field data over some interval of time, this arrangement guarantees that sufficient information is transmitted to provide a baseline image equivalent to the interlaced scanned image. Nominally the multiplexing apparatus passes primary field compressed data and queues data from the secondary field compressor in a respective buffer. When this buffer reaches a predetermined level of fullness a request is made to pass a transport packet of secondary field data. The multiplexor continues passing primary field data until the end of a primary packet has cleared the multiplexor, and then passes a transport packet of secondary field data. During the interval that secondary field data is being serviced, primary field data is queued in a primary field buffer.

Time division multiplexed transport packets of primary and secondary field data are coupled to a modem 42, which conditions the compressed data for transmission on a single channel.

Figure 6:
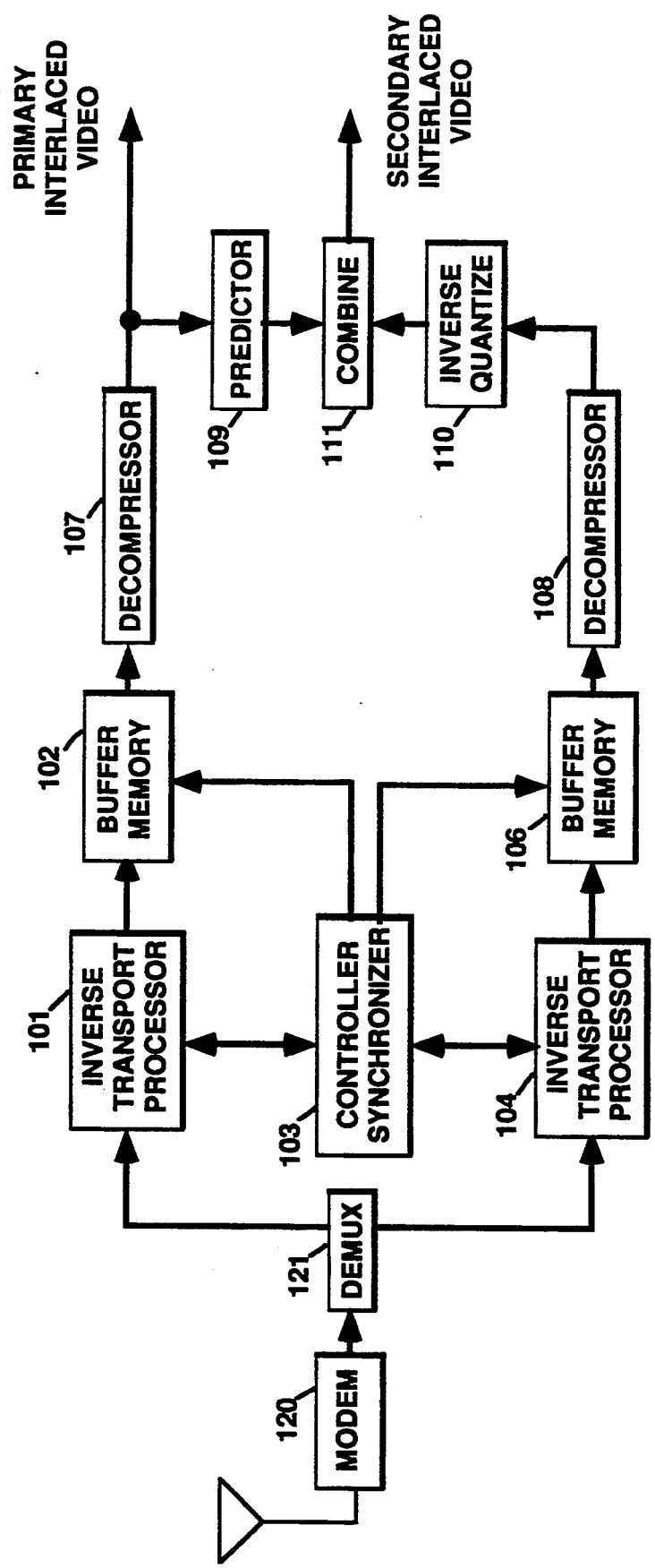

FIG. 6 illustrates an exemplary receiver for processing compressed data provided by the system of FIG. 5. The FIG. 6 arrangement is configured to decompress all of the information transmitted by the modem 42, i.e. to display reproduced non-interlaced scanned images. Receivers constructed to display interlaced scanned data only require the elements 120, 101, 102, 107, and a display device (not shown). Actually neither interlaced scanned receivers nor non-interlaced scanned receivers require a separate demultiplexer 121 and it is only shown to illustrate the requisite inverse functions of the FIG. 5 arrangement. The respective transport packets include identification codes indicating whether the data is primary or secondary. The interlaced scanned receivers will be programmed to process only transport packets in which data is identified as primary. Similarly in a non-interlaced scanned receiver, a single inverse transport processor can be arranged to perform the demultiplexing function based on the primary/secondary identification codes within the transport packets. This type of demultiplexing is, in general, described in the U.S. Pat. No. 5,122,875.

In FIG. 6, time division multiplexed transmitted data is received by a modem 120 which provides baseband compressed time division multiplexed data. This data is coupled to a demultiplexer 121 which separates the primary field data transport packets from the secondary field data transport packets. The primary and secondary field data are respectively coupled to the inverse transport processors 102 and 106, wherein the data payloads are separated from the ancillary (e.g. synchronization, identification etc.) data transmitted therewith. The primary field video data is applied to a buffer memory 102 and secondary field video data is coupled to a buffer memory 106. Transport packet identifier and synchronization data from respective packets are coupled to a controller 1033. The controller 1033, responsive to the ancillary transport packet data, provides the compressed from both of the buffer memories in the appropriate sequence for decompression by the remainder of the apparatus.

The primary field compressed video data from the buffer memory 102 is applied to a decompressor 107 which performs the inverse function of the compressor 14 shown in FIG. 5. The decompressor 107 provides interlaced scanned video data for image reproduction on interlaced scanned display devices (not shown). The decompressed interlaced scanned primary field data is coupled to a secondary field predictor 109, which is similar to the secondary field predictor of FIG. 5.

The secondary field compressed residue data from buffer memory 106 is coupled to a decompressor 108 which performs the inverse function of the compressor 39 in FIG. 5. Decompressed data from the decompressor 108 is applied to an inverse quantizer 110 which re-establishes the original bit-width of the decompressed residue samples and applies them to one input port of an adder circuit 111. The predicted secondary fields are applied to the second input port of the adder 111. The respective sums provided by the adder 111 correspond to the pixel values of the secondary fields. Recall that the residues $R_i$ are the differences between the predicted $P_i$ and actual $A_i$ secondary field information, i.e. $R_i = A_i - P_i$. Thus when the decompressed residues $R_i$ are summed with the predicted secondary field data P provided by predictor 109, the results are the actual secondary field data $A_i$, i.e. $R_i + P_i = (A_i - P_i) + P_i = A_i$. The secondary fields provided by the adder 111 are in interlaced scanned format.

The sums provided by the adder 111, in conjunction with the interlaced signal from decompressor 107, are available for reconstructing a close representation of the original non-interlaced scanned images.

FIG. 4 illustrates an exemplary receiver for processing compressed data provided by the system of FIG. 3. Elements of FIG. 4 identified with similar numbers as elements as elements in FIG. 6 are similar and perform the same function. Operation of the FIG. 4 embodiment will be evident to those skilled in the art of signal processing with the knowledge provided with respect to the FIG. 6 embodiment.

Figure 7:
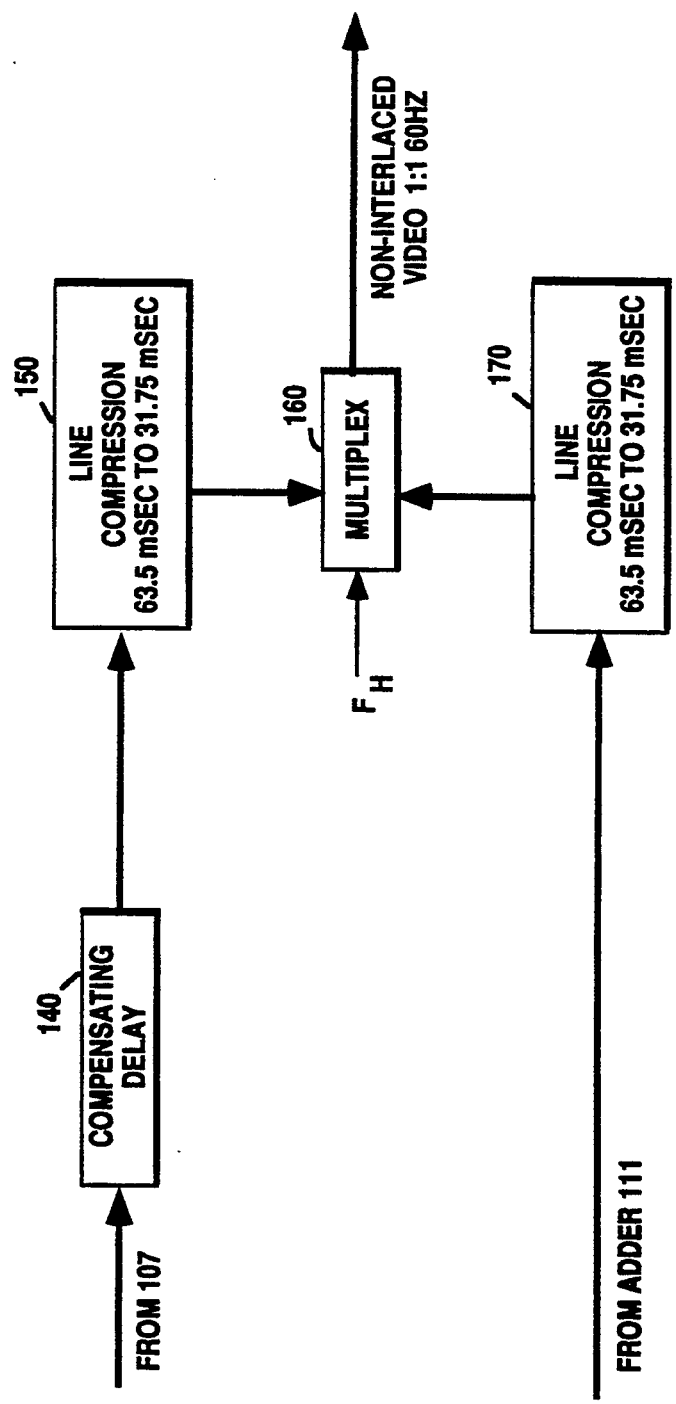
FIG. 7 is a block diagram of apparatus for combining the primary and secondary decompressed video signal to form a non-interlaced scanned signal.

FIG. 7 illustrates exemplary apparatus for combining the primary and secondary decompressed signals provided by the elements 107 and 111 in FIGS. 4 or 6. Both signals are in interlaced scan format and thus the fields occur at 60 Hz with a line duration of approximately 63.5 μsec. To generate non-interlaced video at 60 Hz it is necessary to temporally compress lines of video signal for both the primary field data and the secondary field data. In FIG. 7 the presumption is made that both the compressor 107 and the adder provide standard raster scanned signals, that is they provide interlaced fields of data at a 60 Hz field rate with line times of 63.5 μsec, albeit at different vertical phase due to the processing time incurred in the secondary field predictor 109.

In FIG. 7 decompressed primary field video signal from the decompressor 107 is applied to a compensating delay element 140. Delay element 140 provides sufficient signal delay to compensate for the processing time of the predictor 109, and to properly time the lines of primary and secondary field video signals The delayed primary video signal is applied to a compressor 150 which temporally compresses respective lines of the primary field video signal from 63.5 μsec to 31.75 μsec per line. The compressed lines of data are coupled to one signal input terminal of a two-to-one multiplexer 160. Secondary field video signal from the adder 111 is coupled directly to a second temporal compressor 170, which compresses respective secondary field video lines from 63.5 μsec to 31.75 μsec line. These compressed lines of secondary video are coupled to a second input terminal of the multiplexer 160. The multiplexer is switched at a two times horizontal rate to alternately provide lines of primary and secondary field video and thereby generate a video signal representing non-interlaced scanned video signal.

In the claims that follow, the term "frame" is intended to mean the combination of two interlaced fields when used in relation to interlaced scanned video signal, and means the entire image representative signal produced by one scan of an image, when used in relation to a non-interlaced scanned video signal. A field refers to one half of the horizontal lines required to form a frame representing a complete image of interlaced scanned signal. The lines of any field represent alternate lines of an interlaced scanned frame.

What is claimed is:

1. A method for compressing video signal comprising; providing frames of a non-interlaced scanned video signal and generating from alternate lines of successive frames of the non-interlaced scanned video signal an interlaced scanned video signal designated primary video signal; compressing the primary video signal to provide compressed primary video signal and decompressing the compressed primary video signal; predicting from the decompressed primary video signal, a secondary video signal corresponding to intervening lines of said non-interlaced scanned video signal which were not utilized in generating said primary video signal; generating differences between corresponding pixels of said secondary video signal and video signal corresponding to said intervening lines of said non-interlaced scanned video signal, and compressing said differences; and conditioning said compressed primary video signal and compressed differences for transmission.

2. Apparatus for compressing video signal comprising:

a source of non-interlaced scanned video signal;

a line selector for selecting alternate lines from successive frames of non-interlaced scanned video images to form a frame of primary interlaced scanned video signal, and for selecting intervening lines from said successive frames of said respective non-interlaced scanned video images to form a secondary frame of interlaced scanned video signal;

compression means, responsive to said primary interlaced scanned video signal for providing compressed primary video signal;

means, including a predictor, responsive to said compressed primary video signal for generating a predicted signal corresponding to said secondary interlaced scanned video signal;

a subtracter, responsive to said predicted signal and said secondary interlaced scanned video signal, for generating respective pixel differences between said predicted signal and said secondary interlaced scanned video signal;

means for compressing said pixel differences; and means for conditioning said compressed pixel differences, and said compressed primary video signal, for transmission.

3. The apparatus set forth in claim 2 further comprising a quantizer coupled between an output of said subtracter and an input terminal of said means for compressing said pixel differences, for quantizing said differences prior to compression.

4. The apparatus set forth in claim 2 wherein said means including a predictor comprises:

a decompressor, coupled to an output of said compression means, and responsive to said compressed primary video signal for reproducing said primary interlaced scanned video signal; and interstitial line generating means, coupled to an output of said decompressor, and responsive to reproduced said primary interlaced scanned video signal, for generating lines of video signal that are interstitial lines of said primary interlaced scanned video signal, which interstitial lines correspond to said predicted signal.

5. Apparatus for decompressing compressed video signal including a compressed interlaced scanned video signal component derived from alternate lines of successive frames of non-interlaced scanned video signal, and a compressed residue component derived from differences of intervening lines of said successive frames of non-interlaced scanned video signal and corresponding lines predicted from decompressed said compressed interlaced scanned video signal, said apparatus comprising:

a detector for detecting said compressed video signal;

means including a decompressor, coupled to said detector and responsive to detected said compressed video signal, for decompressing said compressed interlaced scanned video signal component to provide a primary interlaced scanned video signal, and responsive to detected said compressed video signal for decompressing said compressed residue component to provide a secondary decompressed video signal;

a predictor, coupled to said means including a decompressor and responsive to said primary interlaced scanned video signal, for predicting a signal corresponding to said intervening lines;

means for adding corresponding lines of said secondary decompressed video signal and said predicted signal to generate a secondary interlaced scanned video signal; and means for multiplexing odd lines of said secondary interlaced scanned video signal with even lines of said primary interlaced scanned video signal to produce non-interlaced scanned signal.

6. The apparatus set forth in claim 6 further including inverse quantizing apparatus coupled between an output connection of said means for decompressing said compressed residue component and an input connection of said means for multiplexing.

7. The apparatus set forth in claim 5 wherein said compressed interlaced scanned video signal component and said compressed residue component are conveyed in time division multiplexed transport packets and said means for detecting said compressed video signal includes means for separating transport packets of said compressed interlaced scanned video signal component and transport packets of said compressed residue component.

8. Apparatus for decompressing compressed video signal including a compressed interlaced scanned video signal component derived from alternate lines of successive frames of non-interlaced scanned video signal, and a compressed residue component derived from differences of intervening lines of said successive frames of non-interlaced scanned video signal and corresponding lines predicted from decompressed said compressed interlaced scanned video signal, said apparatus comprising:

a detector for detecting said compressed video signal;

means including a decompressor, coupled to said detector and responsive to detected said compressed video signal, for decompressing said compressed interlaced scanned video signal component to provide a primary interlaced scanned video signal, and responsive to detected said compressed video signal for decompressing said compressed residue component to provide a secondary decompressed video signal;

a predictor, coupled to said means including a decompressor and responsive to said primary interlaced scanned video signal, for predicting a signal corresponding to said intervening lines;

means for adding corresponding lines of said secondary decompressed video signal and said predicted signal to generate a secondary interlaced scanned video signal.

* * * * *